United States Patent
Take et al.

(10) Patent No.: US 12,271,094 B2
(45) Date of Patent: Apr. 8, 2025

(54) OPTICAL MODULATOR

(71) Applicant: TDK CORPORATION, Tokyo (JP)

(72) Inventors: Hiroshi Take, Hong Kong (CN); Kenji Nagase, Hong Kong (CN); Anthony Reymund Melad Binarao, Hong Kong (CN); Cheng Bu Heng, Hong Kong (CN)

(73) Assignee: TDK CORPORATION, Tokyo (JP)

( * ) Notice: Subject to any disclaimer, the term of this patent is extended or adjusted under 35 U.S.C. 154(b) by 218 days.

(21) Appl. No.: 17/914,238

(22) PCT Filed: Mar. 31, 2021

(86) PCT No.: PCT/JP2021/013934
§ 371 (c)(1),
(2) Date: Sep. 23, 2022

(87) PCT Pub. No.: WO2021/201133
PCT Pub. Date: Oct. 7, 2021

(65) Prior Publication Data
US 2023/0122741 A1    Apr. 20, 2023

(30) Foreign Application Priority Data
Mar. 31, 2020 (CN) .......................... 202010243496.0

(51) Int. Cl.
*G02F 1/225* (2006.01)
*G02F 1/035* (2006.01)
*G02F 1/21* (2006.01)

(52) U.S. Cl.
CPC .............. *G02F 1/225* (2013.01); *G02F 1/035* (2013.01); *G02F 1/212* (2021.01); *G02F 2201/07* (2013.01); *G02F 2202/20* (2013.01)

(58) Field of Classification Search
CPC ........ G02F 1/0316; G02F 1/035; G02F 1/212; G02F 1/225; G02F 1/2255
See application file for complete search history.

(56) References Cited

U.S. PATENT DOCUMENTS 7,408,693 B2 * 8/2008 Kissa ..................... G02F 1/2255
385/2
12,153,291 B2 * 11/2024 Sacchetto ............. G02F 1/2257
(Continued)

FOREIGN PATENT DOCUMENTS

JP    2006-195383 A    7/2006
JP    2006-201732 A    8/2006
(Continued)

OTHER PUBLICATIONS

Machine translation of WO 2017183484 A1 (Year: 2017).*
(Continued)

*Primary Examiner* — Daniel Petkovsek
*Assistant Examiner* — Emma R. Oxford
(74) *Attorney, Agent, or Firm* — Oliff PLC

(57) ABSTRACT

An optical modulators is disclosed. The optical modulator includes a substrate, an optical waveguide formed on the substrate, a signal electrode formed on the optical waveguide via a first buffer layer and applying a modulation signal to the optical waveguide, and a bias electrode formed on the optical waveguide via a second buffer layer and applying a DC bias to the optical waveguide, the first buffer layer and the second buffer layer are formed in such a way that either one of the first buffer layer and the second buffer layer covers an end surface of the other one of the first buffer layer and the second buffer layer at a boundary part of the first buffer layer and the second buffer layer. Accordingly, an optical modulator with high reliability can be provided.

14 Claims, 5 Drawing Sheets

(56) References Cited

U.S. PATENT DOCUMENTS

| | | | |
|---|---|---|---|
| 2003/0128930 A1* | 7/2003 | Burns | G02F 1/035 385/40 |
| 2007/0297720 A1 | 12/2007 | Sugiyama | |
| 2008/0031564 A1* | 2/2008 | Sugiyama | G02F 1/0356 385/9 |
| 2009/0185774 A1* | 7/2009 | Kiyota | G02F 1/025 385/14 |
| 2012/0099812 A1* | 4/2012 | Kissa | G02F 1/2255 29/846 |
| 2014/0036340 A1* | 2/2014 | Hong | G02B 26/001 359/290 |
| 2020/0310170 A1 | 10/2020 | Iwatsuka et al. | |

FOREIGN PATENT DOCUMENTS

| | | | | |
|---|---|---|---|---|
| JP | 2006-317550 A | | 11/2006 | |
| JP | 2007-199500 A | | 8/2007 | |
| JP | 2007-328257 A | | 12/2007 | |
| JP | 2014-006348 A | | 1/2014 | |
| WO | WO-2017183484 A1 | * | 10/2017 | ............ G02F 1/035 |
| WO | WO-2019039215 A1 | * | 2/2019 | ........... G02F 1/0316 |
| WO | 2019/069815 A1 | | 4/2019 | |

OTHER PUBLICATIONS

Machine translation of WO 2019039215 A1 (Year: 2019).*

Jul. 13, 2021 International Search Report issued in International Patent Application No. PCT/JP2021/013934.

Jul. 13, 2021 Written Opinion of the International Searching Authority issued in International Patent Application No. PCT/JP2021/013934.

* cited by examiner

[Fig. 1]
PRIOR ART
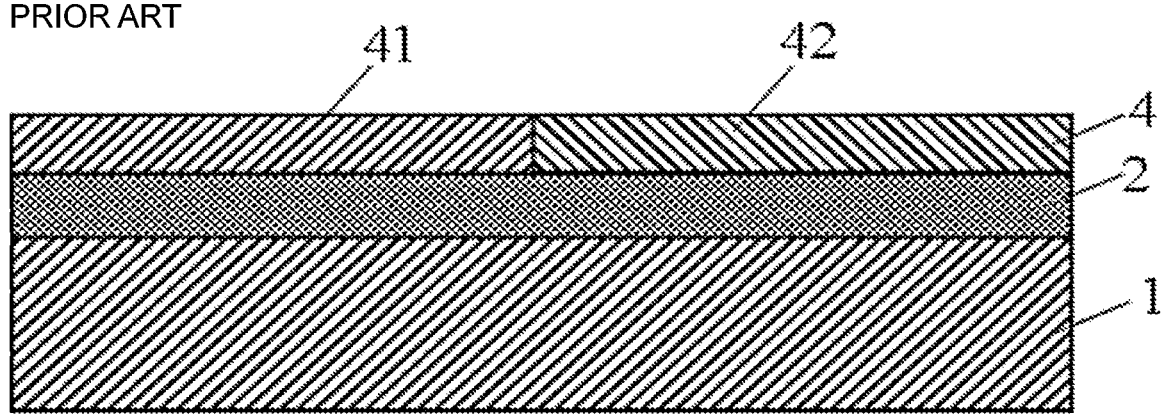
[Fig. 2]
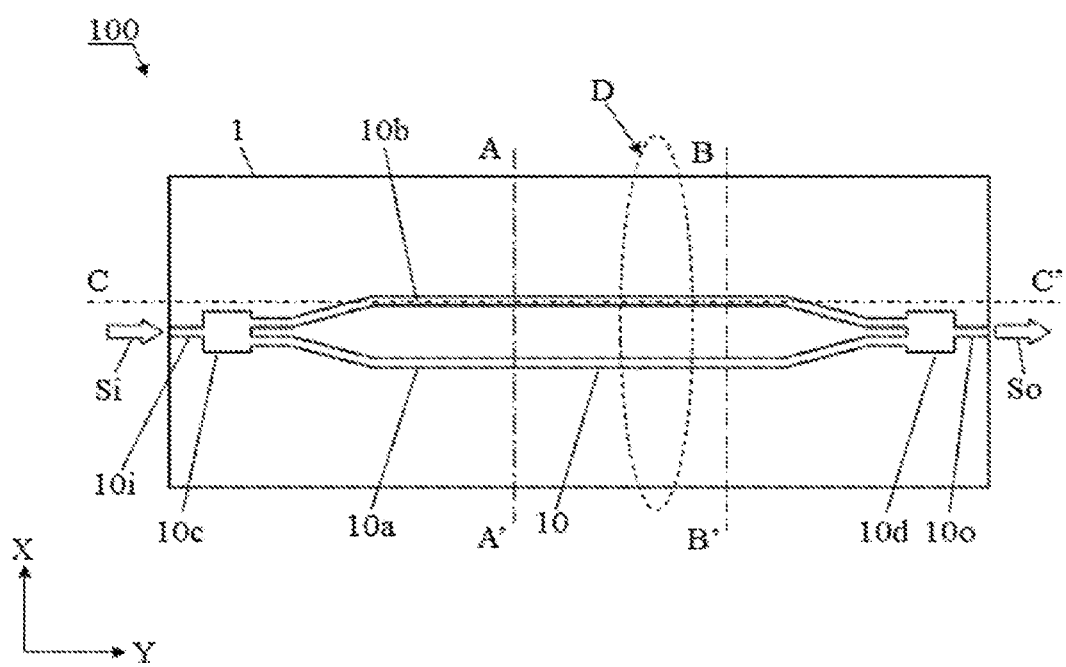

[Fig. 3]
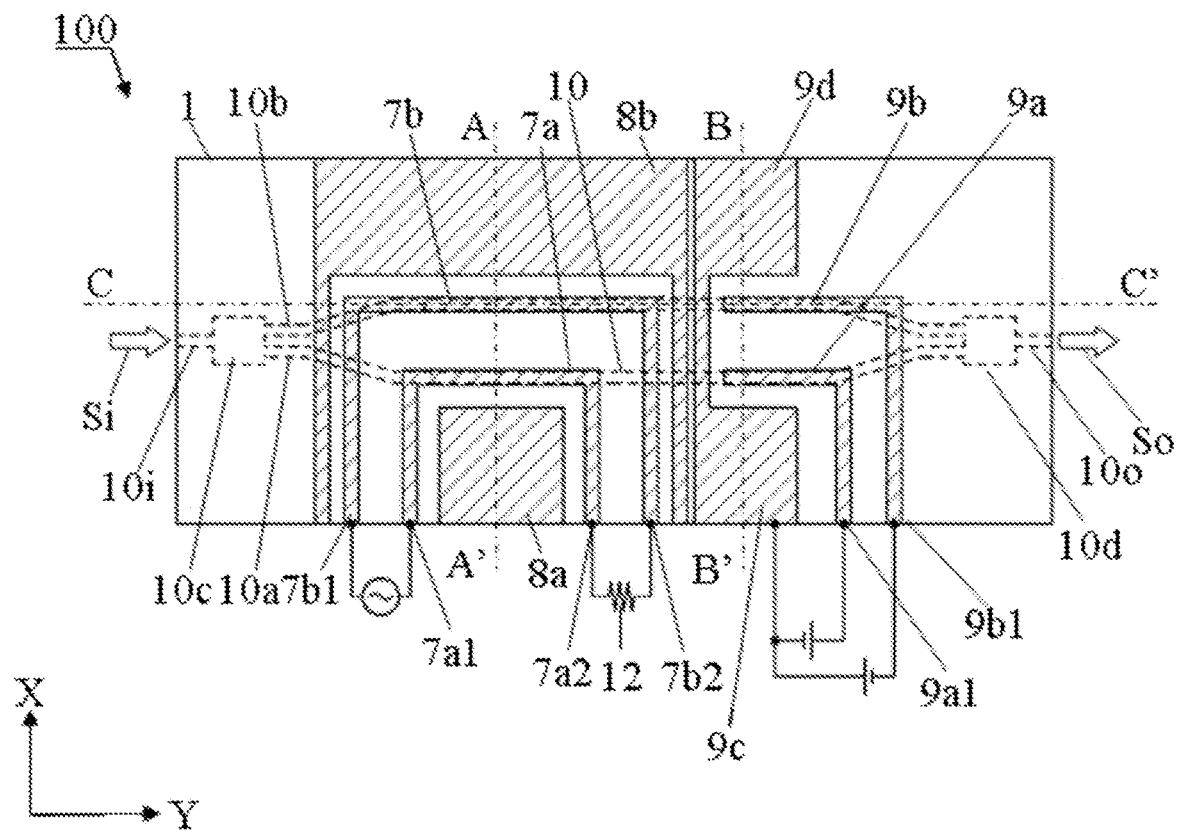
[Fig. 4]
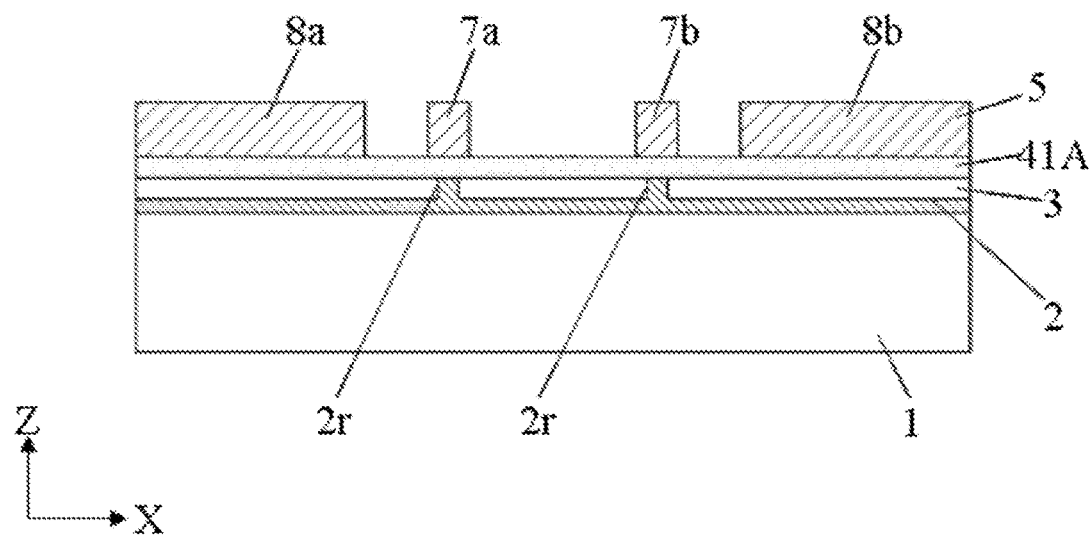

[Fig. 5]
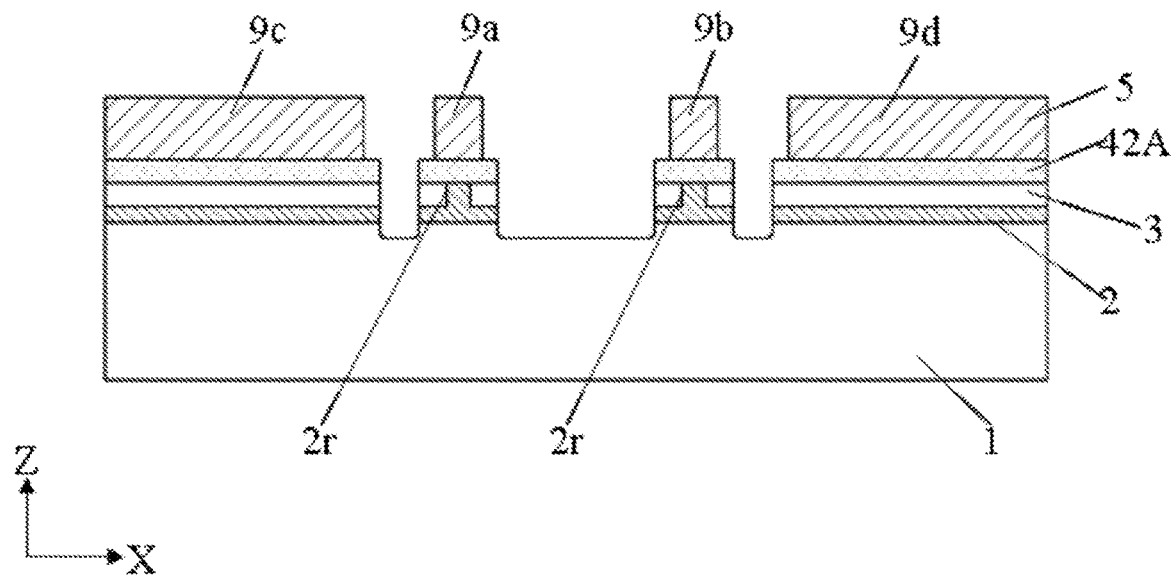
[Fig. 6]
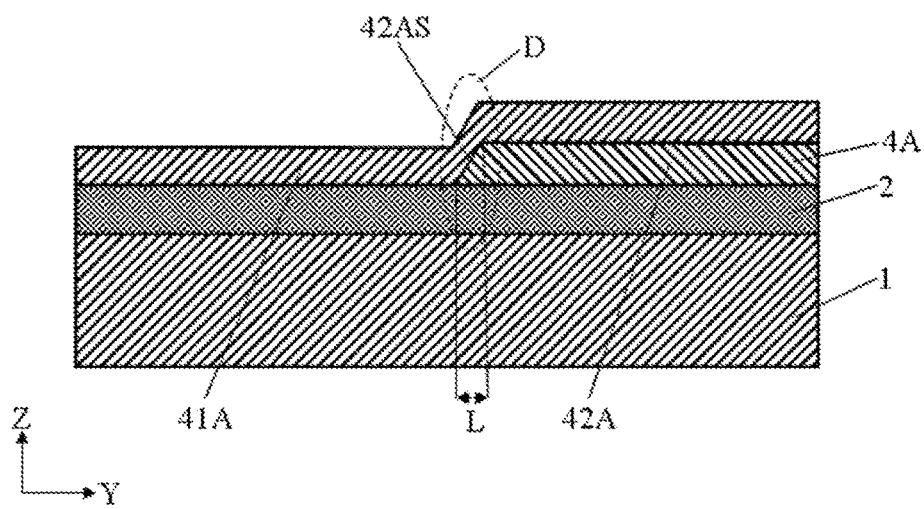

[Fig. 7]
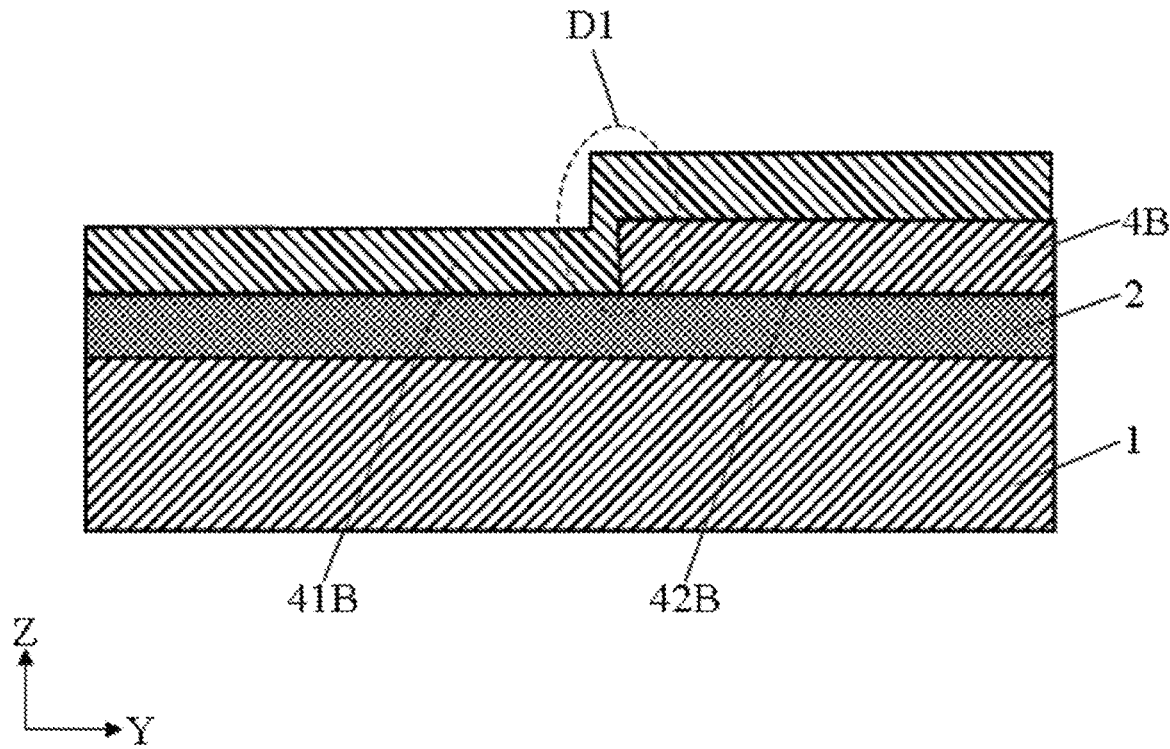
[Fig. 8]
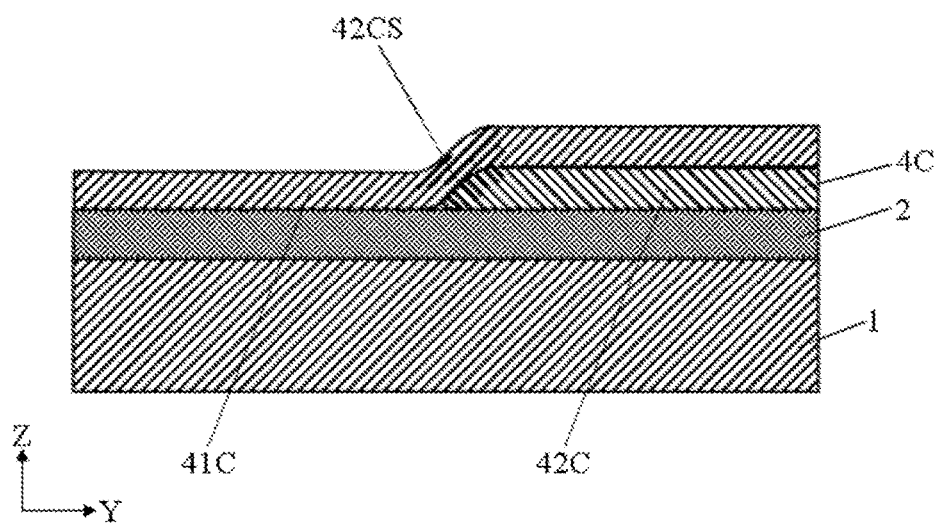

[Fig. 9]
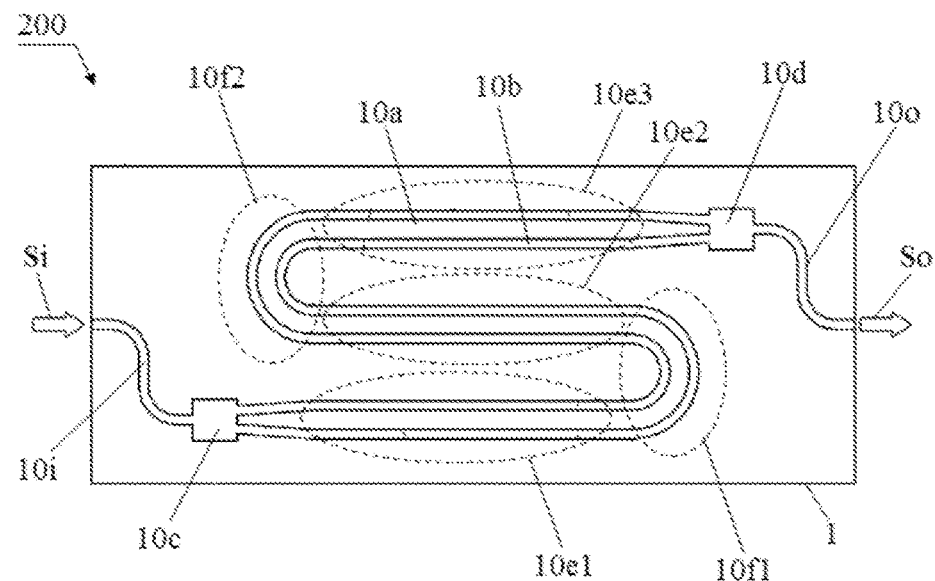
[Fig. 10]
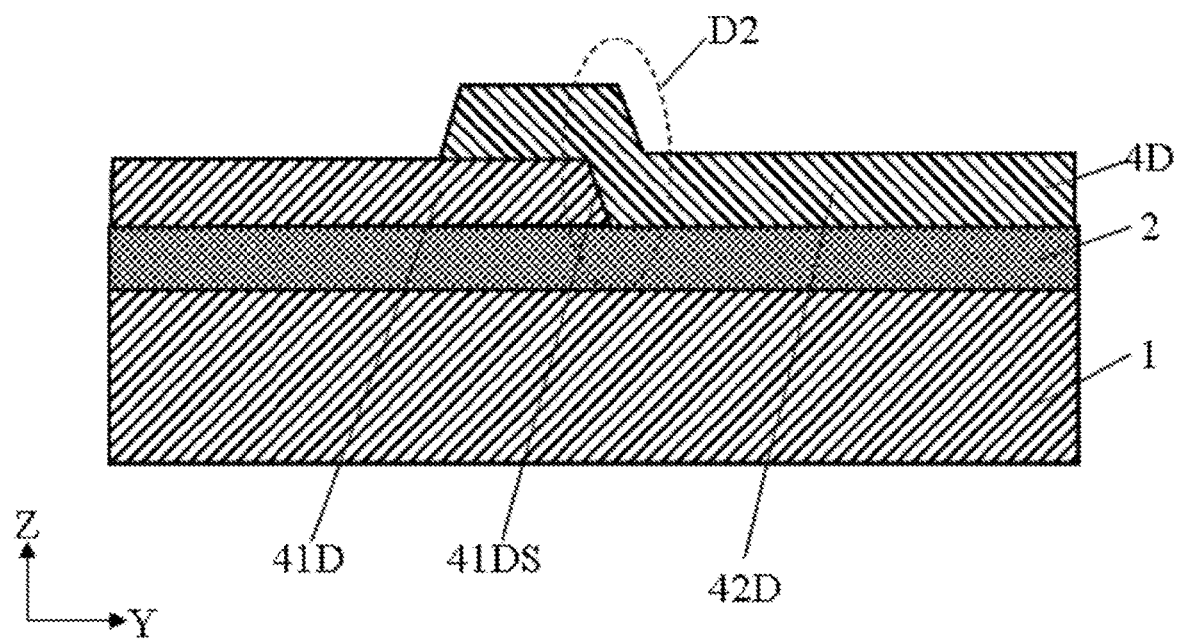

OPTICAL MODULATOR

TECHNICAL FIELD

The present invention relates to an optical modulator used in the fields of optical communication and optical measurement.

BACKGROUND ART

Communication traffic has been remarkably increased with widespread Internet use, and optical fiber communication is becoming significantly important. The optical fiber communication is a technology that converts an electric signal into an optical signal and transmits the optical signal through an optical fiber and has wide bandwidth, low loss, and resistance to noise.

As a system for converting an electric signal into an optical signal, there are known a direct modulation system using a semiconductor laser and an external modulation system using an optical modulator. The direct modulation system does not require the optical modulator and is thus low in cost, but has a limitation in terms of high-speed modulation and, thus, the external modulation system is used for high-speed and long-distance applications.

As an optical modulator, an optical modulator using an optical waveguide formed by lithium niobate ($LiN_bO_3$, hereinafter referred to as "LN") has the advantages of high speed, low loss and less distortion of controlling light waveform. However, compared with semiconductor optical device, it has the disadvantages of large driving voltage and large size.

In order to overcome the above disadvantages, it is known that an optical device with large miniaturization and low driving voltage can be realized by using an optical waveguide with a LN film formed by applying thin film technology on a sapphire substrate (see patent documents 1 and 2).

In such an optical device, the voltage applied to the optical waveguide changes when just after the voltage is applied to the electrode and after a sufficiently long period of time, thereby a phenomenon may be observed that the output light from the optical modulator also changes. The change of the voltage applied to the optical waveguide is called DC drift. It is desired to suppress DC drift as much as possible in the optical modulator. As an optical modulator having the structure capable of reducing DC drift and stably controlling for a long time, an optical modulator of patent document 3 is proposed.

However, in the above optical devices using thin film technology, there are some problems, such as long manufacturing process, temperature change caused by heat treatment in process, and exposure to water for singulation. Therefore, a problem of low reliability in such optical devices exists. For example, as shown in FIG. 1 showing the general structure of an existing optical modulator, in the structure formed by laminating a substrate 1, a waveguide layer 2 and a buffer layer 4, the buffer layer 4 includes a first buffer layer 41 and a second buffer layer 42 of different materials. The first buffer layer 41 and the second buffer layer 42 are arranged parallel to the main surface of the substrate 1 in a manner of the end surface of the first buffer layer 41 and the end surface of the second buffer layer 42 contacting each other, thereby there is a problem that the boundary between the first buffer layer 41 and the second buffer layer 42 is prone to peeling or cracking due to stress and the like.

Therefore, especially for the above optical devices using thin film technology, high reliability optical devices which can withstand such process stress are required.

CITATION LIST

Patent Literature

Prior Art Patent Documents

Patent document 1: JP 2006-195383A
Patent document 2: JP 2014-6348A
Patent document 3: WO2019/069815A

SUMMARY OF INVENTION

The present invention is a result of study in view of the above problems, and aims to provide an optical modulator with high reliability.

In order to achieve the above object, an aspect of the present invention relates to an optical modulator, comprising a substrate, an optical waveguide formed on the substrate, a signal electrode formed on the optical waveguide via a first buffer layer and applying a modulation signal to the optical waveguide, and a bias electrode formed on the optical waveguide via a second buffer layer and applying a DC bias to the optical waveguide, the first buffer layer and the second buffer layer are formed in a manner of either one of the first buffer layer and the second buffer layer covering an end surface of the other one of the first buffer layer and the second buffer layer at the boundary part of the first buffer layer and the second buffer layer. In this way, the first buffer layer and the second buffer layer are formed in such a way that the either one covers the end surface of the other one at the boundary part, so as to form a highly reliable structure with no peeling and cracking occurring and improve yield of the product.

Further, in the optical modulator according to the above aspect of the present invention, it is preferred that the first buffer layer and the second buffer layer are formed in such a way that there is an overlap at the boundary part viewing from a thickness direction of the substrate.

Further, in the optical modulator according to the above aspect of the present invention, it is preferred that the end surface of the other one is obliquely formed relative to the substrate.

Further, in the optical modulator according to the above aspect of the present invention, it is preferred that the end surface of the other one is formed into a curved surface shape.

Further, in the optical modulator according to the above aspect of the present invention, it is preferred that at the boundary part, the first buffer layer is formed on the second buffer layer, or the second buffer layer is formed on the first buffer layer.

Further, in the optical modulator according to the above aspect of the present invention, it is preferred that the length of the end surface of the other one projected to the substrate along a thickness direction of the substrate is 2-100 times relative to a thickness of the other one.

Further, in the optical modulator according to the above aspect of the present invention, it is preferred that the first buffer layer and the second buffer layer are formed by different compositions.

Further, in the optical modulator according to the above aspect of the present invention, it is preferred that the first buffer layer is a M-Si—O compound, wherein M is at least any one or more selected from Al, Zr, Hf, La, Ba, Bi, Ti, Ca, Mo and In.

Further, in the optical modulator according to the above aspect of the present invention, it is preferred that the elements constituting the second buffer layer include at least any one or more of the elements constituting the first buffer layer.

According to one aspect of the invention, an optical modulator with high reliability is provided.

BRIEF DESCRIPTION OF DRAWINGS

FIG. 1 is a cross-sectional view of an optical modulator in the prior art.

FIG. 2 is a top view of an optical modulator 100 according to a first embodiment of the present invention.

FIG. 3 is a top view of the whole optical modulator 100 including a traveling wave electrode.

FIG. 4 is a cross-sectional view of the optical modulator along the A-A' line in FIG. 2.

FIG. 5 is a cross-sectional view of the optical modulator along the B-B' line in FIG. 2.

FIG. 6 is a cross-sectional view of the optical modulator along the C-C' line in FIG. 2.

FIG. 7 is a cross-sectional view of an optical modulator according to a variation of the first embodiment of the present invention.

FIG. 8 is a cross-sectional view of an optical modulator according to another variation of the first embodiment of the present invention.

FIG. 9 is a top view of the optical modulator 200 according to a second embodiment of the present invention.

FIG. 10 is a cross-sectional view of the optical modulator according to a third embodiment of the present invention.

DESCRIPTION OF EMBODIMENTS

Preferred embodiments of the present invention will be described in detail with reference to the accompanying drawings. Herein, in the description of the drawings, the same or similar elements are illustrated with the same reference number, and the repeated descriptions are omitted.

A First Embodiment

FIG. 2 is a top view of the optical modulator 100 according to a first embodiment of the present invention. FIG. 3 is a top view of the whole optical modulator 100 including a traveling wave electrode. FIG. 4 is a cross-sectional view of the optical modulator along the A-A' line in FIG. 2. FIG. 5 is a cross-sectional view of the optical modulator along the B-B' line in FIG. 2. FIG. 6 is a cross-sectional view of the optical modulator along the C-C' line in FIG. 2.

As illustrated in FIGS. 2 and 3, the optical modulator 100 includes a Mach-Zehnder optical waveguide 10 formed on a substrate 1 and having first and second optical waveguides 10a and 10b provided in parallel to each other, a first signal electrode 7a provided overlapping the first optical waveguide 10a, a second signal electrode 7b provided overlapping the second optical waveguide 10b, first and second ground electrodes 8a and 8b provided sandwiching the first and second signal electrodes 7a and 7b therebetween, a first bias electrode 9a provided overlapping the first optical waveguide 10a, and a second bias electrode 9b provided overlapping the second optical waveguide 10b, a third bias electrode 9c provided adjacent to the first bias electrode 9a, and a fourth bias electrode 9d provided adjacent to the second bias electrode 9b.

The Mach-Zehnder optical waveguide 10 is an optical waveguide having a Mach-Zehnder interferometer structure. The Mach-Zehnder optical waveguide 10 has the first and second optical waveguides 10a and 10b which are branched from a single input optical waveguide 10i at a branch part 10c, and the first and second optical waveguides 10a and 10b are combined into a single output optical waveguide 10o at a multiplexing part 10d. An input light Si is branched at the branch part 10c. The branched lights travel through the first and second optical waveguides 10a and 10b and then multiplexed at the multiplexing part 10d. The multiplexed light is output from the output optical waveguide 10o as a modulated light So.

The first and second signal electrodes 7a and 7b are positioned between the first and second ground electrodes 8a and 8b in a plan view. One ends 7a1 and 7b1 of the first and second signal electrodes 7a and 7b each serve as a signal input terminal, and the other ends 7a2 and 7b2 thereof are connected to each other through a terminal resistor 12. Alternatively, the other end 7a2 of the first signal electrode 7a may be connected to the first ground electrode 8a through a first terminal resistor, and the other end 7b2 of the second signal electrode 7b may be connected to the second ground electrode 8b through a second terminal resistor. As a result, the first and second signal electrodes 7a and 7b, together with the first and second ground electrodes 8a and 8b, function as coplanar traveling wave electrodes of differential.

The first and second bias electrodes 9a and 9b are provided independently of the first and second signal electrode 7a and 7b, respectively, so as to apply direct-current bias voltage (DC bias) to the first and second optical waveguides 10a and 10b. One ends 9a1 and 9b1 of the first and second bias electrodes 9a and 9b are each an input terminal of the DC bias. Although, in the present embodiment, the first and second bias electrodes 9a and 9b are positioned closer to the output terminal side of the Mach-Zehnder optical waveguide 10 than the formation area of the first and second signal electrode 7a and 7b, they may be positioned closer to the input terminal side. Further, the first and second bias electrodes 9a and 9b may be omitted, and instead, a modulated signal including superimposed DC bias may be input to the first and second signal electrode 7a and 7b.

AC signals (modulated signals) are input to the one end 7a1 of the first signal electrode 7a and one end 7b1 of the second signal electrode 7b. The first and second optical waveguides 10a and 10b are formed of a material, such as lithium niobate having electro-optic effect, so that the refractive indices of the first and second optical waveguides 10a and 10b are changed with +Δn and −Δn by an electric field applied to the first and second optical waveguides 10a and 10b, with the result that a phase difference between the pair of optical waveguides changes. A signal light modulated by the change in the phase difference is output from the output optical waveguide 10o.

As illustrated in FIG. 4~FIG. 6, the optical modulator 100 according to the present embodiment has a multilayer structure including a substrate 1, a waveguide layer 2, a protective layer 3, a buffer layer 4A, and an electrode layer 5 which are laminated in this order. The substrate 1 is, e.g., a sapphire substrate, and the waveguide layer 2 formed of an electro-optic material, such as a lithium niobate film, is formed on the surface of the substrate 1. The waveguide layer 2 has the first and second optical waveguides 10a and 10b each formed by a ridge part 2r.

The buffer layer 4A is formed on the upper surfaces of the ridge parts 2r of the waveguide layer 2 so as to prevent light propagating through the first and second optical waveguides 10a and 10b from being absorbed by the first and second signal electrodes 7a and 7b. The buffer layer 4A is preferably formed of a material having a lower refractive index than that of the waveguide layer 2 and a high transparency, and the thickness thereof may be about 0.2 µm to 1.2 µm. In the present embodiment, although the buffer layer 4A covers not only the upper surfaces of the respective first and second optical waveguides 10a and 10b, but also the entire underlying surface including the upper surface of the protective layer 3, it may be patterned so as to selectively cover only the vicinity of the upper surfaces of the first and second optical waveguides 10a and 10b. Further, the buffer layer 4A may be directly formed on the upper surface of the waveguide layer 2 with the protective layer 3 omitted.

The film thickness of the buffer layer 4A is preferably as large as possible in order to reduce light absorption of an electrode and preferably as small as possible in order to apply a high electric field to the first and second optical waveguides 10a and 10b. The light absorption and applied voltage of an electrode have a trade-off relation, so that it is necessary to set an adequate film thickness according to the purpose. The dielectric constant of the buffer layer 4A is preferably as high as possible, because the higher the dielectric constant thereof, the more $V\pi L$ (index representing electric field efficiency) is reduced. Further, the refractive index of the buffer layer 4A is preferably as low as possible, because the lower the refractive index thereof, the thinner the buffer layer 4A can be. In general, a material having a high dielectric constant has a higher refractive index, so that it is important to select a material having a high dielectric constant and a comparatively low refractive index considering the balance therebetween. For example, $Al_2O_3$ has a specific dielectric constant of about 9 and a refractive index of about 1.6 and is thus preferable. $LaAlO_3$ has a specific dielectric constant of about 13 and a refractive index of about 1.7, and $LaYO_3$ has a specific dielectric constant of about 17 and a refractive index of about 1.7 and are thus particularly preferable.

The buffer layer 4A includes a first buffer layer 41A on the protective layer 3 and the waveguide layer 2 (specifically, the ridge 2r of the waveguide layer 2) and a second buffer layer 42A on the protective layer 3 and the waveguide layer 2 (specifically, the ridge 2r of the waveguide layer 2). The first buffer layer 41A and the second buffer layer 42A are formed in such a way that the first buffer layer 41A directly covers the end surface 42AS of the second buffer layer 42A at the boundary part D of the first buffer layer 41A and the second buffer layer 42A. In this way, by forming the first buffer layer and the second buffer layer in such a way that the first buffer layer directly covers the end surface of the second buffer layer at the boundary part of the first buffer layer and the second buffer layer, a highly reliable structure without peeling and cracking is achieved, and the yield of the products is improved.

Furthermore, in this embodiment, the first buffer layer 41A covers not only the end surface 42AS of the second buffer layer 42a, but also the whole upper surface of the second buffer layer 42A. However, not limited to this, the first buffer layer 41A may cover only a part of the upper surface of the second buffer layer 42A.

Specifically, in the present embodiment, the first buffer layer 41A and the second buffer layer 42A are formed in such a way that there is an overlap at the boundary part D as viewed from the thickness direction Z of the substrate 1. That is, at the boundary part D, the first buffer layer 41A is formed on the second buffer layer 42A.

However, not limited to the above structure, it can also be as follows: a buffer layer 4B as shown in FIG. 7 includes a first buffer layer 41B and a second buffer layer 42B. The first buffer layer 41B and the second buffer layer 42B are formed in such a way that there is no overlap when viewed from the thickness direction Z of the substrate 1 at the boundary part D1.

In the case that the first buffer layer 41A and the second buffer layer 42A are formed in such a way that there is an overlap at the boundary part D as viewed from the thickness direction Z of the substrate 1, as a specific example, for example, as shown in FIG. 6, the end surface 42AS of the second buffer layer 42A is formed obliquely with respect to the substrate 1. However, it is not limited to this. As shown in FIG. 8, the buffer layer 4C includes a first buffer layer 41C and a second buffer layer 42C, and the end surface 42CS of the second buffer layer 42C is formed into a curved surface shape.

In addition, the length L of the end surface 42AS of the second buffer layer 42A projected onto the substrate 1 along the thickness direction Z of the substrate 1 is preferably 2-100 times of the thickness of the second buffer layer 42A.

In the present embodiment, the first buffer layer 41A and the second buffer layer 42A may be formed with different compositions or the same composition. For example, the first buffer layer 41A is M-Si—O compound, wherein M is at least any one or more selected from Al, Zr, Hf, La, Ba, Bi, Ti, Ca, Mo and In. In addition, the elements constituting the second buffer layer 42A may contain at least any one or more of the elements constituting the first buffer layer 41A.

The electrode layer 5 is provided with the first signal electrode 7a, second signal electrode 7b, first ground electrode 8a and second ground electrode 8b. The first signal electrode 7a is provided overlapping the ridge part 2r corresponding to the first optical waveguide 10a so as to modulate light traveling inside the first optical waveguide 10a and is opposed to the first optical waveguide 10a through the first buffer layer 41A. The second signal electrode 7b is provided overlapping the ridge part 2r corresponding to the second optical waveguide 10b so as to modulate light traveling inside the second optical waveguide 10b and is opposed to the second optical waveguide 10b through the first buffer layer 41A. The first ground electrode 8a is provided on the side opposite to the second signal electrode 7b with respect to the first signal electrode 7a, and the second ground electrode 8b is provided on the side opposite to the first signal electrode 7a with respect to the second signal electrode 7b.

Further, the electrode layer 5 is provided with the first bias electrode 9a, the second bias electrode 9b, the third bias electrode 9c and the fourth bias electrode 9d. The first bias electrode 9a is provided overlapping the ridge part 2r corresponding to the first optical waveguide 10a so as to apply direct-current bias voltage (DC bias) to the first optical waveguides 10a and is opposed to the first optical waveguide 10a through the second buffer layer 42A. The second signal electrode 7b is provided overlapping the ridge part 2r corresponding to the second optical waveguide 10b so as to apply direct-current bias voltage (DC bias) to the second optical waveguides 10b and is opposed to the second optical waveguide 10b through the second buffer layer 42A.

Although the waveguide layer 2 is not particularly limited in type so long as it is formed of an electro-optic material, it is preferably formed of lithium niobate ($LiNbO_3$). This is because lithium niobate has a large electro-optic constant and is thus suitable as the constituent material of an optical device such as an optical modulator. Hereinafter, the configuration of the present embodiment when the waveguide layer 2 is formed using a lithium niobate film will be described in detail.

Although the substrate 1 is not particularly limited in type as long as it has a lower refractive index than the lithium niobate film, it is preferably a substrate on which the lithium niobate film can be formed as an epitaxial film. Specifically, the substrate 1 is preferably a sapphire single-crystal substrate or a silicon single-crystal substrate. The crystal orientation of the single-crystal substrate is not particularly limited. The lithium niobate film can be easily formed as a c-axis oriented epitaxial film on single-crystal substrates having different crystal orientations. Since the c-axis oriented lithium niobate film has three-fold symmetry, the underlying single-crystal substrate preferably has the same symmetry. Thus, the single-crystal sapphire substrate preferably has a c-plane, and the single-crystal silicon substrate preferably has a (111) surface.

The "epitaxial film" refers to a film having the crystal orientation of the underlying substrate or film. Assuming that the film surface extends in X-Y plane and that the film thickness direction (i.e., the thickness direction of the substrate 1) is Z-axis direction, the crystal of the epitaxial film is uniformly oriented along the X-axis, Y-axis and Z-axis.

The lithium niobate film has a composition of $Li_xNbA_yO_z$. A denotes an element other than Li, Nb, and O, wherein x ranges from 0.5 to 1.2, preferably 0.9 to 1.05, y ranges from 0 to 0.5, and z ranges from 1.5 to 4, preferably 2.5 to 3.5. Examples of the element A include K, Na, Rb, Cs, Be, Mg, Ca, Sr, Ba, Ti, Zr, Hf, V, Cr, Mo, W, Fe, Co, Ni, Zn, Sc, and Ce, alone or a combination of two or more of them.

The lithium niobate film preferably has a film thickness of equal to or smaller than 2 m. This is because a high-quality lithium niobate film having a thickness larger than 2 m is difficult to form. The lithium niobate film having an excessively small thickness cannot completely confine light in it, allowing the light to penetrate through the substrate 1 and/or the buffer layer 4. Application of an electric field to the lithium niobate film may therefore cause a small change in the effective refractive index of the optical waveguides (10a and 10b). Thus, the lithium niobate film preferably has a film thickness that is at least approximately one-tenth of the wavelength of light to be used.

The lithium niobate film is preferably formed using a film formation method, such as sputtering, CVD or sol-gel process. Application of an electric field in parallel to the c-axis of the lithium niobate that is oriented perpendicular to the main surface of the substrate 1 can change the optical refractive index in proportion to the electric field. In the case of the single-crystal substrate made of sapphire, the lithium niobate film can be directly epitaxially grown on the sapphire single-crystal substrate. In the case of the single-crystal substrate made of silicon, the lithium niobate film is epitaxially grown on a clad layer (not illustrated). The clad layer (not illustrated) has a refractive index lower than that of the lithium niobate film and should be suitable for epitaxial growth. For example, a high-quality lithium niobate film can be formed on a clad layer (not illustrated) made of $Y_2O_3$.

As a formation method for the lithium niobate film, there is known a method of thinly polishing or slicing the lithium niobate single crystal substrate. This method has an advantage that characteristics same as those of the single crystal can be obtained and can be applied to the present invention.

A Second Embodiment

FIG. 9 is a top view of the optical modulator 200 according to a second embodiment of the present invention. As shown in FIG. 9, the difference between the optical modulator 200 of the present embodiment and the optical modulator 100 of the first embodiment is that the Mach-Zehnder optical waveguide 10 is constructed by a combination of a linear section and a curved section. The other structures of the optical modulator 200 according to the present embodiment are the same as those of the optical modulator 100 according to the first embodiment, so the detailed descriptions are omitted.

Specifically, the Mach-Zehnder optical waveguide 10 has first to third linear sections $10e_1$, $10e_2$ and $10e_3$ arranged parallel to one another, a first curved section $10f_1$ connecting the first and second linear sections $10e_1$ and $10e_2$, and a second curved section $10f_2$ connecting the second and third linear sections $10e_2$ and $10e_3$.

In the present embodiment, the input light Si is input to one end of the first linear section $10e_1$, travels from the one end of the first linear section $10e_1$ toward the other end thereof, makes a U-turn at the first curved section $10f_1$, travels from one end of the second linear section $10e_2$ toward the other end thereof in the direction opposite to that in the first linear section $10e_1$, makes a U-turn at the second curved section $10f_2$, and travels from one end of the third linear section $10e_3$ toward the other end thereof in the direction same as that in the first linear section $10e_1$.

The optical modulator has a problem of a large element length in practical applications. However, by folding the optical waveguide as illustrated, the element length can be significantly reduced, obtaining a remarkable effect. Particularly, the optical waveguide formed of the lithium niobate film is featured in that it has small loss even when the curvature radius thereof is reduced up to about 50 μm and is thus suitable for the present embodiment.

A Third Embodiment

FIG. 10 is a cross-sectional view of the optical modulator according to a third embodiment of the present invention. The difference between the optical modulator according to the present embodiment and the optical modulator 100 according to the first embodiment is that the buffer layer 4D includes a first buffer layer 41D and a second buffer layer 42D.

The first buffer layer 41D and the second buffer layer 42D are formed in such a way that the second buffer layer 42D directly covers the end surface 41DS of the first buffer layer 41D at the boundary part D2 of the first buffer layer 41D and the second buffer layer 42D. The other structures of the optical modulator 200 according to the present embodiment are the same as those of the optical modulator 100 according to the first embodiment, so the detailed descriptions are omitted.

Furthermore, in the present embodiment, the second buffer layer 42D covers not only the end surface 41DS of the first buffer layer 41D, but also a part of the upper surface of the first buffer layer 41D. However, it is not limited to this, and the second buffer layer 42D may cover the whole of the upper surface of the first buffer layer 41D.

Specifically, in the present embodiment, the first buffer layer 41D and the second buffer layer 42D are formed in such a way that there is an overlap at the boundary part D2 as viewed from the thickness direction Z of the substrate 1. That is, at the boundary part D2, the second buffer layer 42D is formed on the first buffer layer 41D.

While the preferred embodiments of the present invention have been described, the present invention is not limited to the above embodiments, and various modifications may be made within the scope of the present invention, and all such modifications are included in the present invention.

For example, in the above embodiments, the optical modulator has the pair of optical waveguides 10a and 10b each formed of the lithium niobate film epitaxially grown on the substrate 1; however, the present invention is not limited to such a structure, but the optical waveguides may be formed of an electro-optic material such as barium titanate or lead zirconium titanate. Further, as the waveguide layer 2, a semiconductor material, a polymer material, or the like having electro-optic effect may be used.

In addition, the present invention relates to the design of the relationship between the interfaces (the interfaces between the ends) of two buffer layers (i.e., the first buffer layer and the second buffer layer) in the same layer. Therefore, there is no special limitation for the upper and lower layers of the buffer layer of the present invention, wherein other layers may be included, or other layers may not be included.

REFERENCE SIGNS LIST 1 substrate
2 waveguide layer
3 protective layer
4A buffer layer
4B buffer layer
4C buffer layer
4D buffer layer
41A first buffer layer
42A second buffer layer
41B first buffer layer
42B second buffer layer
41C first buffer layer
42C second buffer layer
41D first buffer layer
42D second buffer layer
41DS end surface
42AS end surface
42CS end surface
5 electrode layer
7a first signal electrode
7b second signal electrode
9a first bias electrode
9b second bias electrode
10 optical waveguide
10a first optical waveguide
10b second optical waveguide
100 optical modulator
200 optical modulator
D boundary part
D1 boundary part
D2 boundary part

The invention claimed is:

1. An optical modulator, comprising:
a substrate, with an optical waveguide being formed on the substrate,
a signal electrode formed on the optical waveguide via a first buffer layer and being configured to apply a modulation signal to the optical waveguide, and
a bias electrode formed on the optical waveguide via a second buffer layer and being configured to apply a DC bias to the optical waveguide,
wherein the first buffer layer and the second buffer layer are arranged such that either one of the first buffer layer and the second buffer layer covers both a top surface and a side surface of the other one of the first buffer layer and the second buffer layer, at a boundary part of the first buffer layer and the second buffer layer,
the first buffer layer has a first bottom surface extending along at least a portion of its length,
the second buffer layer has a second bottom surface extending along at least a portion of its length, and
the first bottom surface is flush with the second bottom surface.

2. The optical modulator as claimed in claim 1, wherein the first buffer layer and the second buffer layer are formed such that there is an overlap at the boundary part.

3. The optical modulator as claimed in claim 2, wherein at the boundary part, the first buffer layer is formed on the second buffer layer, or the second buffer layer is formed on the first buffer layer.

4. The optical modulator as claimed in claim 2, wherein a length of the side surface of the other one projected to the substrate along the thickness direction of the substrate is 2-100 times a thickness of the other one.

5. The optical modulator as claimed in claim 1, wherein the side surface of the other one is obliquely formed relative to the substrate.

6. The optical modulator as claimed in claim 5, wherein at the boundary part, the first buffer layer is formed on the second buffer layer, or the second buffer layer is formed on the first buffer layer.

7. The optical modulator as claimed in claim 5, wherein a horizontal length of the side surface of the other one as projected to the substrate along the thickness direction of the substrate is 2-100 times a thickness of the other one.

8. The optical modulator as claimed in claim 1, wherein the side surface of the other one is formed into a curved surface shape.

9. The optical modulator as claimed in claim 8, wherein at the boundary part, the first buffer layer is formed on the second buffer layer, or the second buffer layer is formed on the first buffer layer.

10. The optical modulator as claimed in claim 8, wherein a length of the side surface of the other one projected to the substrate along the thickness direction of the substrate is 2-100 times a thickness of the other one.

11. The optical modulator as claimed in claim 1, wherein the first buffer layer and the second buffer layer have different compositions.

12. The optical modulator as claimed in claim 1, wherein the first buffer layer is a M-Si—O compound, wherein M is at least any one or more selected from Al, Zr, Hf, La, Ba, Bi, Ti, Ca, Mo and In.

13. The optical modulator as claimed in claim 1, wherein elements constituting the second buffer layer include at least any one or more of elements constituting the first buffer layer.

14. The optical modulator as claimed in claim 1, wherein
the first buffer layer and the second buffer layer are
   formed such that there is an overlap at the boundary
   part,
the side surface of the other one is obliquely formed
   relative to the substrate, and
a horizontal length of the obliquely formed side surface of
   the other one as projected to the substrate along the
   thickness direction of the substrate is 2-100 times a
   thickness of the other one.

\* \* \* \* \*